US012752608B2

(12) United States Patent
Yang

(10) Patent No.: US 12,752,608 B2
(45) Date of Patent: Oct. 6, 2026

(54) SHADING DEVICE AND VEHICLE

(71) Applicant: Bayerische Motoren Werke Aktiengesellschaft, Munich (DE)

(72) Inventor: Xiaofei Yang, Beijing (CN)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 392 days.

(21) Appl. No.: 18/285,142

(22) PCT Filed: Mar. 17, 2022

(86) PCT No.: PCT/EP2022/057079
§ 371 (c)(1),
(2) Date: Sep. 29, 2023

(87) PCT Pub. No.: WO2022/207352
PCT Pub. Date: Oct. 6, 2022

(65) Prior Publication Data

US 2024/0174058 A1 May 30, 2024

(30) Foreign Application Priority Data

Mar. 29, 2021 (CN) ......................... 202110329958.5

(51) Int. Cl.
*B60J 1/20* (2006.01)

(52) U.S. Cl.
CPC ........... *B60J 1/2041* (2013.01); *B60J 1/2044* (2013.01); *B60J 1/2072* (2013.01); *B60J 1/2086* (2013.01)

(58) Field of Classification Search
CPC ...... B60J 1/2013; B60J 1/2041; B60J 1/2044; B60J 1/205; B60J 1/2058; B60J 1/2072; B60J 1/2086
(Continued)

(56) References Cited

U.S. PATENT DOCUMENTS 8,590,959 B2 * 11/2013 Durm ..................... B60J 1/2083 160/370.22
9,649,914 B2 * 5/2017 Meier ...................... B60J 1/203
(Continued)

FOREIGN PATENT DOCUMENTS

CN 106114151 A 11/2016
DE 10 2016 202 016 A1 8/2017
(Continued)

OTHER PUBLICATIONS

English translation of FR 2941735; retrieved via Patent Translate located at www.epo.org. (Year: 2025).*
(Continued)

*Primary Examiner* — Jason S Daniels
(74) *Attorney, Agent, or Firm* — Crowell & Moring LLP

(57) ABSTRACT

A shading device includes a shading curtain, a drawing device, and connection joints. The shading curtain has a first and a second shading layer, wherein the first and the second shading layer respectively have at least two types of light transmission areas with different light transmission properties. The drawing device has a first and a second drawing member. One of the connection joints is configured to apply an enhanced tensile force on the associated shading layer in the fully deployed state in comparison with in the retracted state of the shading curtain, so that the first and the second shading layer are in the second relative position.

11 Claims, 12 Drawing Sheets

(58) Field of Classification Search
USPC ............................................... 296/97.2, 97.8
See application file for complete search history.

(56) References Cited

U.S. PATENT DOCUMENTS

| | | | | |
|---|---|---|---|---|
| 10,926,612 | B2 * | 2/2021 | Kim ...................... | B60J 1/2033 |
| 2006/0082192 | A1 | 4/2006 | Dubay et al. | |
| 2016/0325607 | A1 | 11/2016 | Meier | |
| 2019/0047381 | A1 | 2/2019 | Lekar et al. | |

FOREIGN PATENT DOCUMENTS

| | | | |
|---|---|---|---|
| FR | 2 941 735 | A1 | 8/2010 |
| WO | WO 2013/171038 | A1 | 11/2013 |

OTHER PUBLICATIONS

English translation of Chinese-language Search Report issued in Taiwanese Application No. 111108851 dated Sep. 26, 2024 (1 page).
International Search Report (PCT/ISA/210) issued in PCT Application No. PCT/EP2022/057079 dated Jul. 6, 2022 (2 pages).
Written Opinion (PCT/ISA/237) issued in PCT Application No. PCT/EP2022/057079 dated Jul. 6, 2022 (6 pages).

* cited by examiner

SHADING DEVICE AND VEHICLE

BACKGROUND AND SUMMARY

The disclosure relates to a shading device for shading the light. The shading device may be applied to a vehicle, for example, to a side window, a windshield, a rear window, or a sunroof of a passenger vehicle.

In some known vehicles, a shading device is provided, which can be configured to shade the light, for example, the sunlight on a sunny summer day, which can save energy and improve the comfort of a vehicle occupant. The shading device may have a shading curtain. A conventional shading curtain for a vehicle is single-layer and has a substantially unchangeable shading effect.

An object of the present disclosure is to provide a shading device, by which a desired shading effect can be reliably realized.

To this end, a shading device is proposed, which comprises:

- a shading curtain having a first and a second shading layer, wherein the first and the second shading layer respectively have at least two types of light transmission areas with different light transmission properties, and
- a drawing device having a first and a second drawing member, wherein the first drawing member is connected to the first shading layer and is configured to draw the first shading layer, and the second drawing member is connected to the second shading layer and is configured to draw the second shading layer,
- wherein the shading curtain is configured to be switchable between a retracted state and a fully deployed state, wherein the first and the second shading layer can parallelly move relative to each other between a first relative position, in which the shading curtain has a first light transmission property, and a second relative position, in which the shading curtain has a second light transmission property,
- wherein the shading device further comprises a reel having a first connection joint with the first shading layer and a reel having a second connection joint with the second shading layer,
- wherein the first and the second shading layer are rolled on the respective reels, and the first and the second shading layer are in the first relative position, in the retracted state of the shading curtain,
- wherein one of the connection joints can apply an enhanced tensile force on the associated shading layer in the fully deployed state of the shading curtain in comparison with that in the retracted state, so that the first and the second shading layer are in the second relative position.

In the shading device according to the present disclosure, the two shading layers of the shading curtain can be kept in good parallelism both during a deployment process and during a retraction process, wherein the two shading layers may have only slight friction or even have substantially no friction with each other. The shading device may have a simple structure and may provide a variable shading effect.

In some embodiments, the reel for the first shading layer and the reel for the second shading layer may be the same one reel, and the first and the second connection joints are spaced from each other in a circumferential direction of the same one reel. This configuration may be especially simple in structure.

In some embodiments, the reel(s) may have a circular cross section.

In some embodiments, the reel(s) may have a cam cross section, and the one connection joint is located at a vertex of the cam cross section.

In some embodiments, the reel for the first shading layer and the reel for the second shading layer may be two separate reels with parallel axes.

In some embodiments, the drawing member, which is associated with the same shading layer as the one connection joint, may be configured as an elastic element, especially a spring element.

In some embodiments, the drawing member, which is associated with the same shading layer as the one connection joint, may be a movable member in the drawing device, wherein the movable member can be kept in its rest position by an elastic force of an elastic element, especially a spring element, and can leave away from its rest position when the tensile force applied by the one connection joint overcomes the elastic force.

In some embodiments, the one connection joint may be the second connection joint, and the second shading layer may be an outer shading layer of the shading curtain.

In some embodiments, the first light transmission property may correspond to one of a maximum light transmission amount and a minimum light transmission amount of the shading curtain, and the second light transmission property may correspond to the other of the maximum light transmission amount and the minimum light transmission amount of the shading curtain. The minimum light transmission amount may be an opaque state, for example. In the sense of the present disclosure, the light transmission property or the light transmission amount of the shading curtain may be understood as a characteristic parameter in a planar state of the shading curtain.

In some embodiments, each shading layer may have distributed first light transmission areas and distributed second light transmission areas, wherein the first light transmission areas have a higher light transmission rate than the second light transmission areas, wherein the first light transmission areas of the first and the second shading layer overlap and the second light transmission areas of the first and the second shading layer overlap in the first relative position, and hence the shading curtain may have the maximum light transmission amount in the planar state, and wherein the first light transmission areas of the first shading layer overlap with the second light transmission areas of the second shading layer and the second light transmission areas of the first shading layer overlap with the first light transmission areas of the second shading layer in the second relative position, and hence the shading curtain may have the minimum light transmission amount in the planar state, especially it may be opaque.

In some embodiments, the first transmission areas may be transparent or translucent, and the second transmission areas may be opaque. Alternatively, the first transmission areas may be transparent, and the second transmission areas may have a dark color.

In some embodiments, the shading device may be configured for a vehicle, preferably for a side window of a motor vehicle, and further preferably, the shading curtain may be configured to be deployed from one of a front side and a rear side of the side window to the other side thereof. The vehicle may be especially a motor vehicle, such as a passenger car or a truck. Alternatively, the shading device may also be configured for a windshield, a rear window, or a sunroof for a motor vehicle.

In some embodiments, the shading device may comprise a driving device configured to drive the drawing device. The driving device may be, for example, an electric motor or a hydraulic driving device.

In some embodiments, the driving device can drive the drawing device through a supporting rod.

In some embodiments, the supporting rod may be movable in a plane.

In some embodiments, the shading device may comprise a guide rail configured to receive and guide the supporting rod.

In some embodiments, the driving device can drive the supporting rod through a Bowden wire.

In some embodiments, the guide rail may be further configured to receive and guide a longitudinal side of the shading curtain.

In some embodiments, the first and the second shading layer may be made of a flexible material respectively.

In some embodiments, the reel(s) of the shading curtain may be oriented substantially vertically. Therefore, the shading curtain can be drawn laterally, or can be deployed and can be retracted in a direction substantially perpendicular to the vertical line.

In some embodiments, the reel(s) of the shading curtain may have an angle to the vertical line within 30°, such as about 5°, about 10° or about 15°.

A vehicle, especially a motor vehicle, in particular a passenger car, is also claimed, which comprises the shading device according to any one of the embodiments of the present disclosure.

It should be pointed out, the individual technical features mentioned above, the individual technical features to be mentioned below and the individual technical features shown in the drawings can be arbitrarily combined with each other, only if the combined technical features are not contradictory with each other.

BRIEF DESCRIPTION OF DRAWINGS

Some embodiments of the present disclosure are described below with reference to following schematic drawings, in which.

DETAILED DESCRIPTION OF THE DRAWINGS

Some specific embodiments of the present disclosure are described in detail with reference to the accompanying drawings, so that the above-mentioned objects, features and advantages of the present disclosure can be understood well. In the following description, specific details are set forth, so that the present disclosure can be understood well. However, the present disclosure may be implemented in various ways different from those described embodiments, and those skilled in the art can make equivalents and modifications without departing from the sense of the present disclosure. Therefore, the present disclosure is not limited to the specific disclosed embodiments.

It should be pointed out, the singular form in the specification can also include the plural form, unless specifically excluded. Furthermore, components, steps, operations and elements that are used together with the term "comprising" or "including" mean that at least one other component, step, operation and element may be present or supplemented. The terms "first" and "second" and the like in the specification are used only for the convenience of describing and distinguishing different components with the same name, and don't imply the sequence or the primary-secondary relationship of the associated components.

Figure 1A:
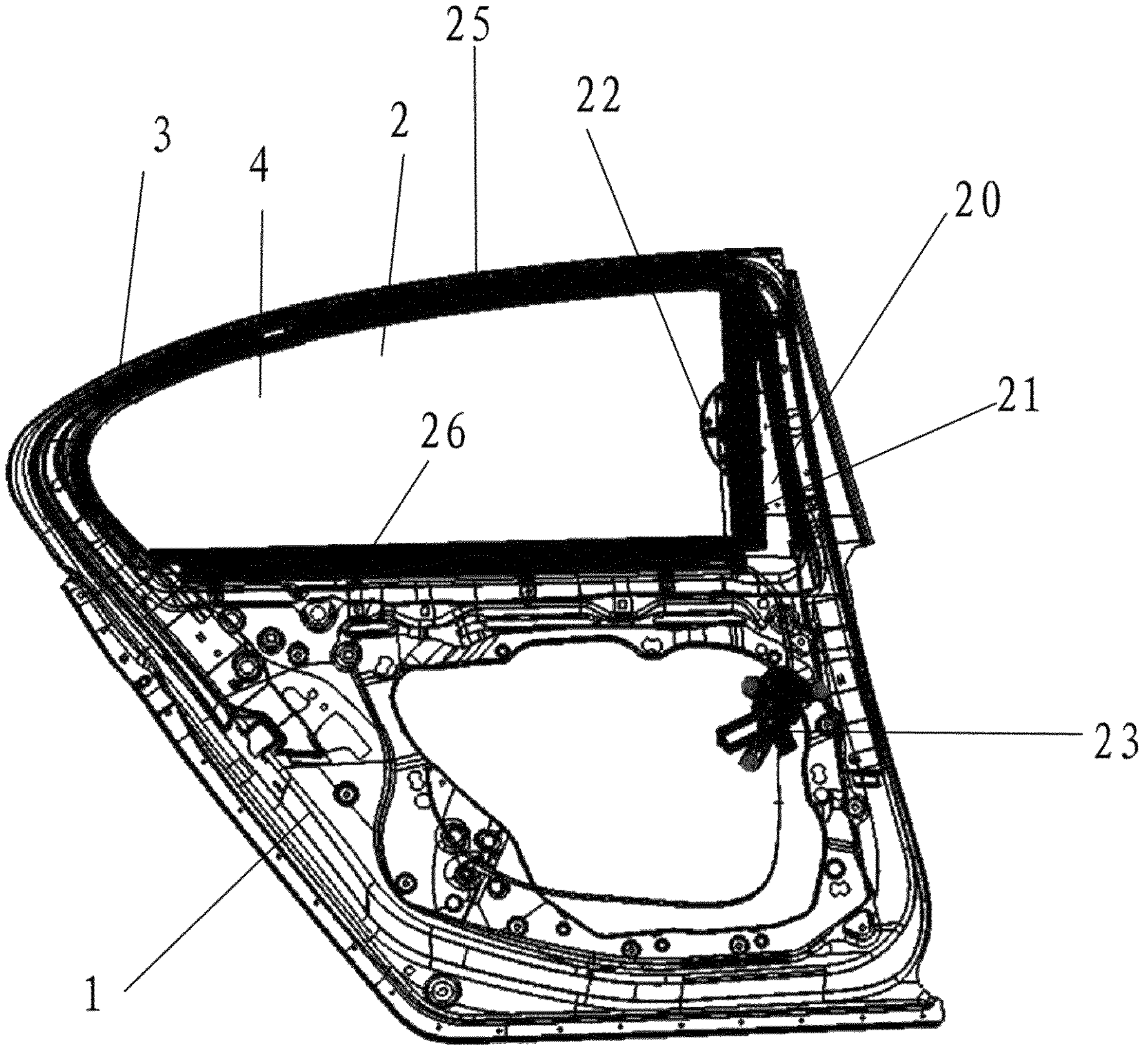
FIGS. 1A to 1C are perspective views of a vehicle door equipped with a shading device according to an embodiment of the present disclosure in different deployed positions.
Figure 1B:
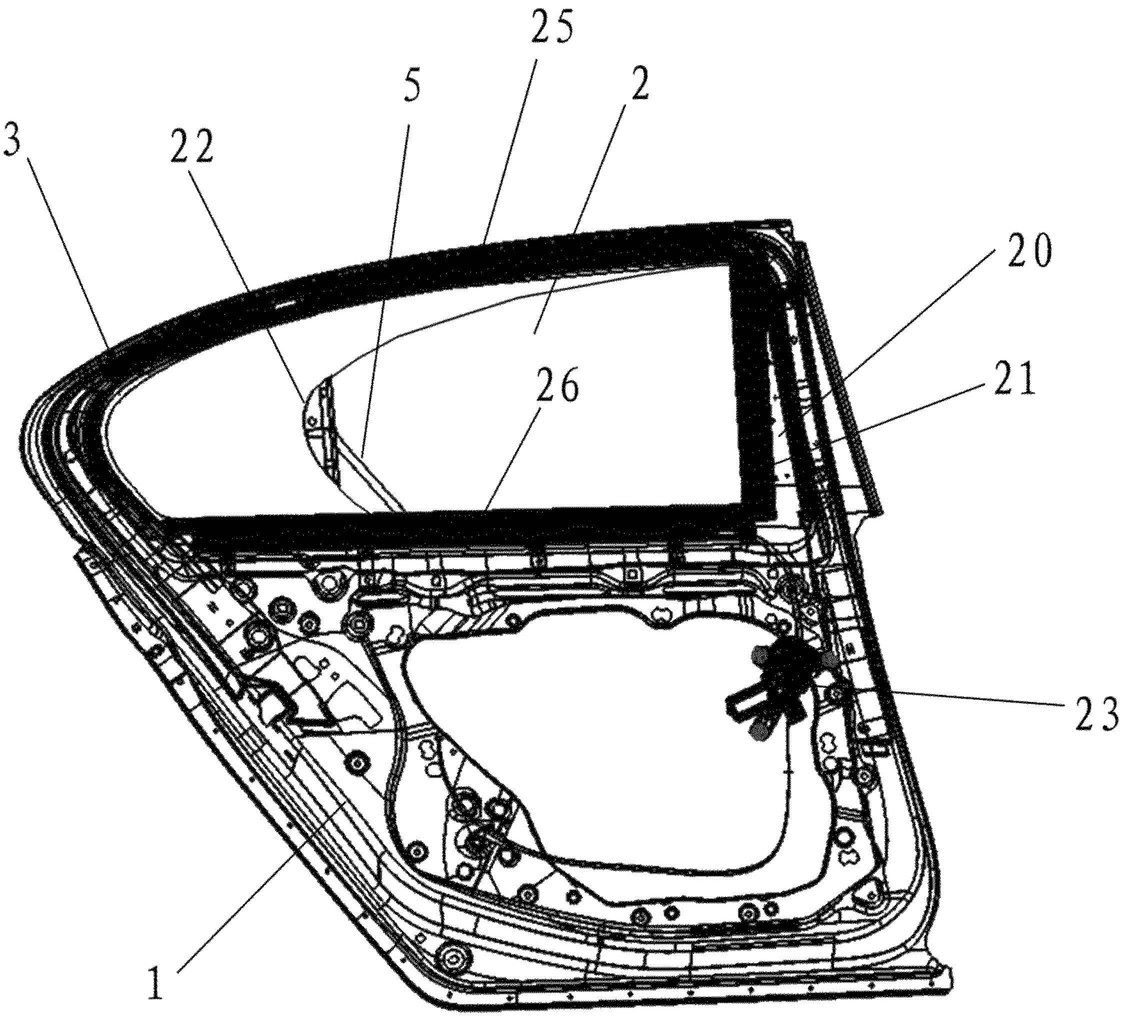
Figure 1C:
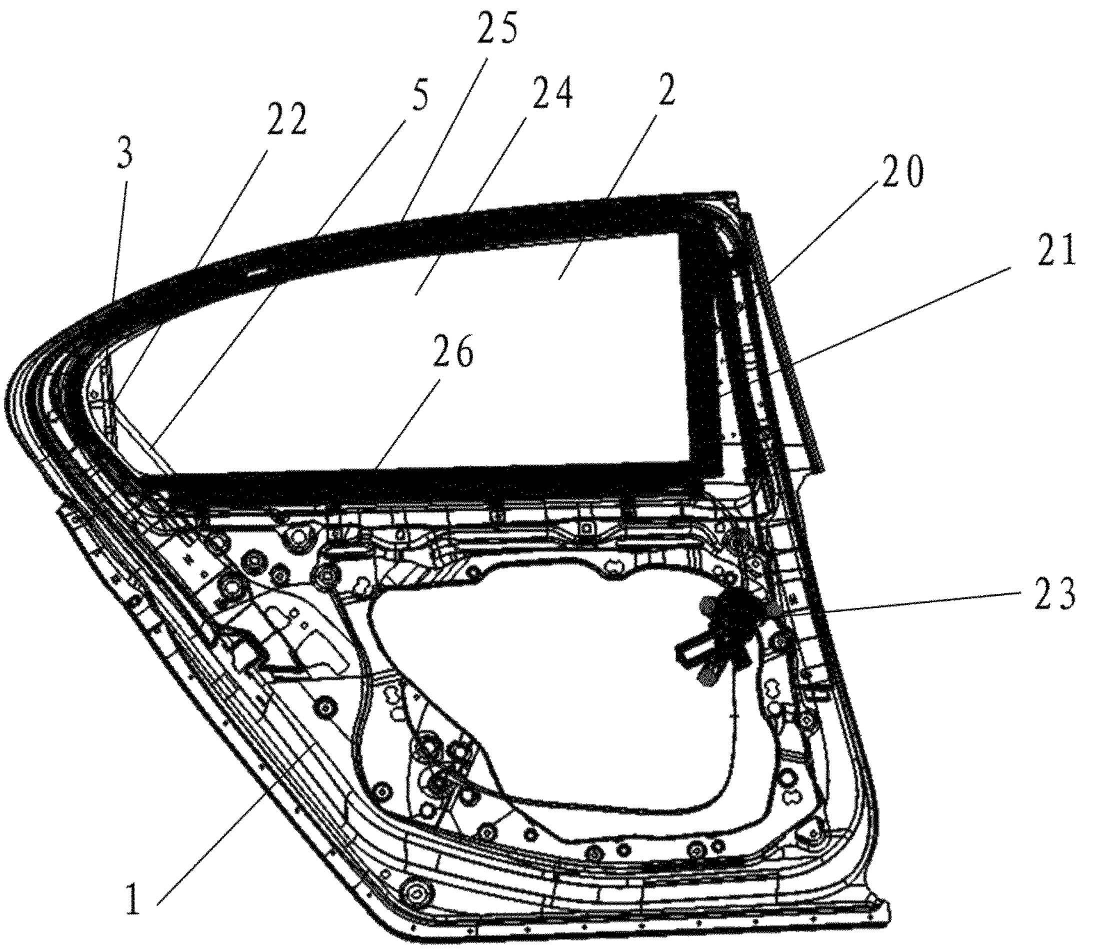

FIGS. 1A-1C are perspective views of a vehicle door 1 equipped with a shading device 20 according to an embodiment of the present disclosure viewed from the inside of the vehicle. The shading device 20 is shown in a retracted state in FIG. 1A, and the shading device 20 is shown in an intermediate state in a deployment process in FIG. 1B, and the shading device 20 is shown in a fully deployed state in FIG. 1C, in which the shading device 20 can at least partially, especially completely shade the light from the outside of the window of the vehicle to the interior space of the vehicle.

The vehicle door 1 has a side window 2, which includes a window frame 3 and a window glass 4 mounted to the window frame. The side window 2 is equipped with the shading device 20 mentioned above, which may be arranged in the interior space of the vehicle, in other words, inside the side window 2. The shading device 20 comprises a shading curtain 24. The shading device 20 may comprise a housing 21, which may be mounted to a rear end region of the side window 2, for example, wherein the shading curtain 24 can be retracted and received in the housing 21, and can be drawn out from the housing 21 by a drawing device 22 until it reaches a front end region of the side window 2 opposite to the rear end region, that is to say, it reaches the fully deployed state.

The shading device 20 may further comprise a driving device 23, which may be mounted to a sheet metal part of the door, for example, and may be covered by a door trim. The driving device 23 may be an electric motor, for example. The driving device 23 may be configured to drive the drawing device 22, so that the drawing device 22 can be moved to deploy and/or retract the shading curtain 24. The transmission between the driving device 23 and the drawing device 22 may be designed according to the actual requirements. For example, the driving device 23 can drive a Bowden wire, which can drive an operation rod 5, which can operate the drawing device 22. For example, it is also possible that the driving device 23 drives an endless wire rope drive, which can drive an operation element, such as an operation rod 5, which can operate the drawing device 22. The driving device 23 may be provided with a control unit, so that the drawing device 22 driven by the driving device 23 can stay in any desired intermediate position between the retracted position and the fully deployed position in principle.

The shading device 20 may have a guide rail 26 in which an operation element such as an operation rod 5 and/or a Bowden wire can be guided. To this end, for example, the guide rail 26 may have a groove, wherein the driving device 23 can drive and move the operation rod 5 in the groove of the guide rail. It's advantageous, the operation rod 5 can move in a plane. It's particularly advantageous, the operation rod 5 can be deflected by a predetermined angle from a substantially vertical position in a predetermined deployment stroke of the shading curtain 24 starting from the retracted position, and then the angular position of the operation rod 5 can be kept unchanged in the continued deployment stroke of the shading curtain 24. As an addition, a lower longitudinal side of the shading curtain 24 may also be received and guided in the groove of the guide rail 26. The shading device may have another guide rail 25 configured for the other upper longitudinal side of the shading curtain 24.

The application of the shading device 20 shown in FIGS. 1A to 1C is exemplary. In an alternative application, a deployment length of the shading curtain 24 may correspond to a portion, such as half, of a length of the side window 2. In an alternative application, the housing of the shading device may be arranged in a lower end region of the side window 2, and the shading curtain may be deployed in an upward direction towards an upper end region of the side window 2.

Figure 7A:
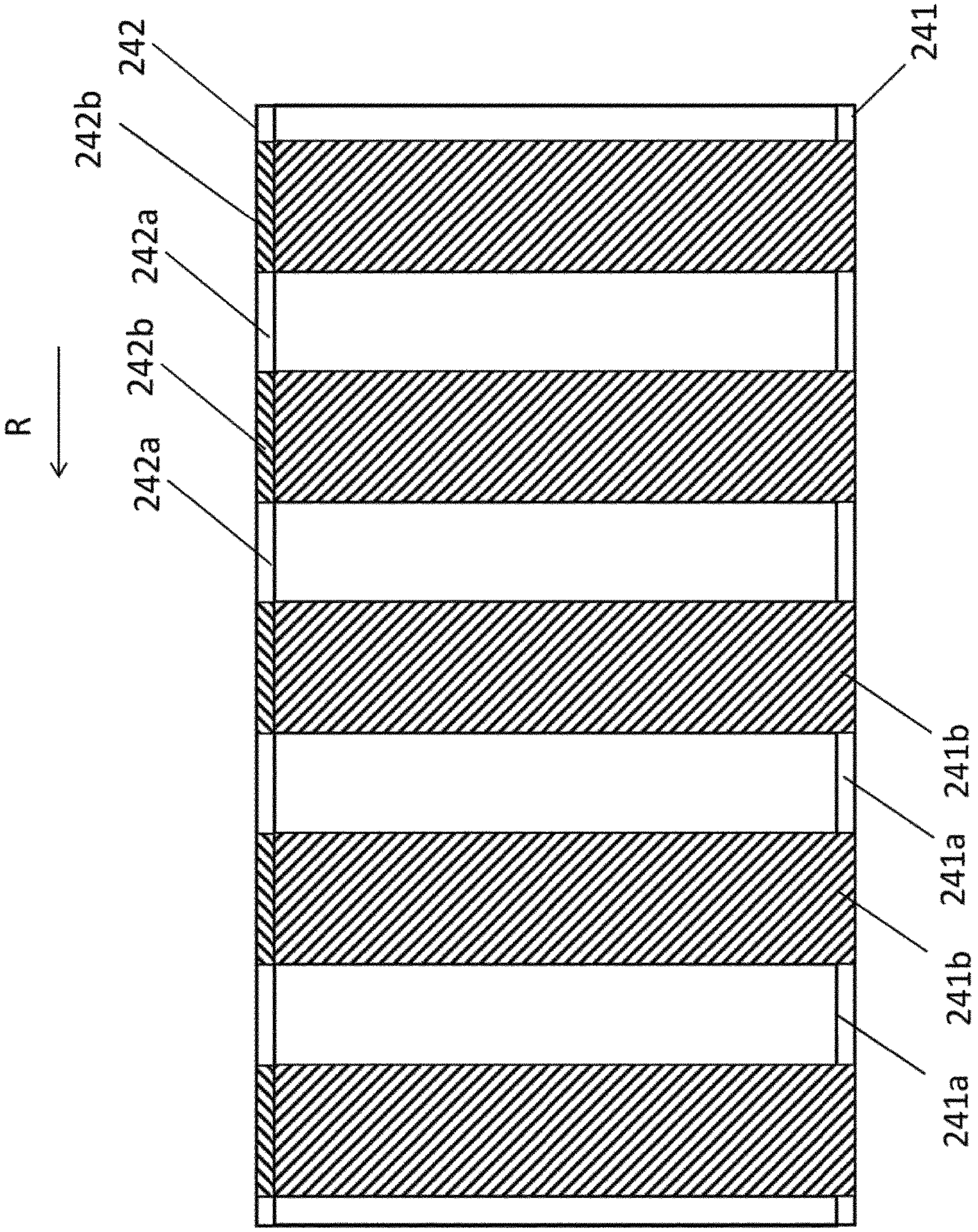
FIGS. 7A to 7C are schematic views of a shading curtain in different states.
Figure 7B:
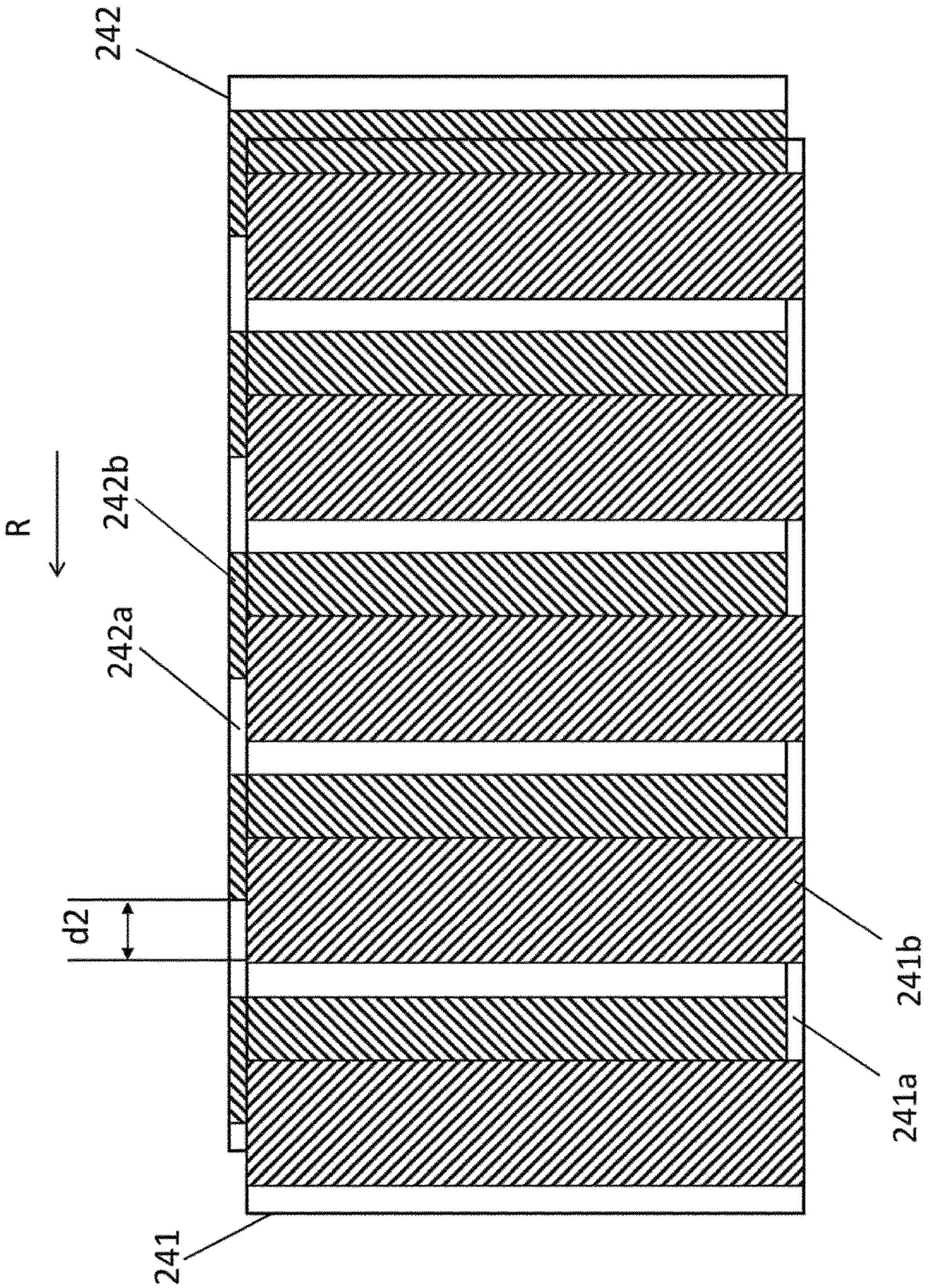
Figure 7C:
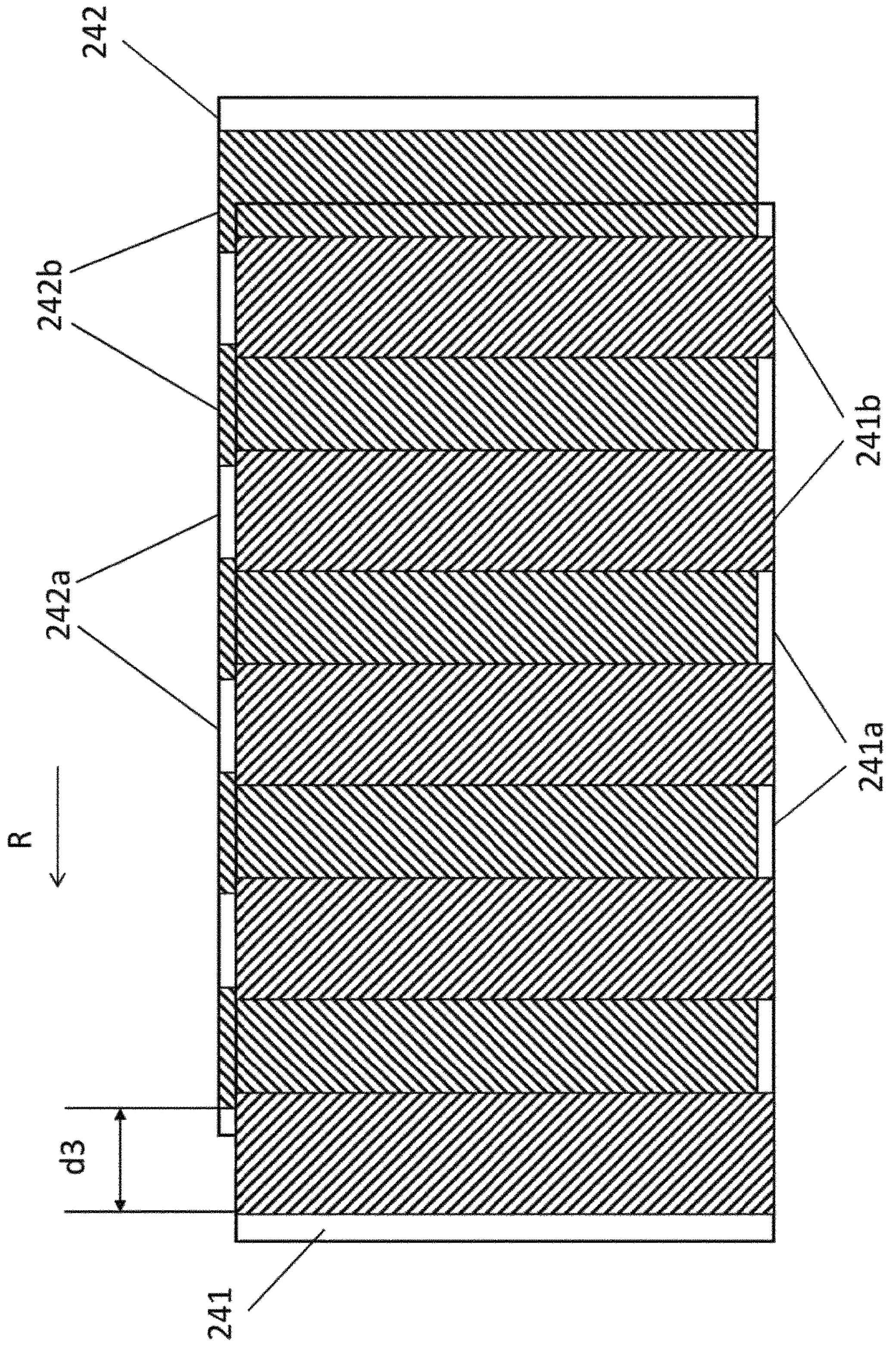

The shading curtain 24 may comprise a first and a second shading layer 241 and 242, which may respectively include at least two types of light transmission areas with different light transmission properties. FIGS. 7A to 7C are schematic views of a shading curtain 24 according to an embodiment of the present disclosure in different states. In the shown embodiment, the two shading layers 241 and 242 of the shading curtain 24 may be constructed identically. For better illustrating the two shading layers, they are shown with an offset in a height direction. In practice, the two shading layers may be completely overlap in the height direction. Each individual shading layer 241, 242 may have first light transmission areas 241*a*, 242*a* and second light transmission areas 241*b*, 242*b*, which are arranged alternately periodically, and which may extend transversely to the deployment direction of the shading curtain and may have a constant width. The light transmission rate of the first light transmission areas is higher than that of the second light transmission areas. It's advantageous, the first light transmission areas 241*a*, 242*a* may be transparent or translucent, and the second light transmission areas 241*b*, 242*b* may be completely opaque. The shading layers may be made of a flexible material, such as fabrics.

FIG. 7A shows the shading curtain 24 in a first state, in which the first light transmission areas 241*a*, 242*a* of the first and the second shading layer 241, 242 overlap, and the second light transmission areas 241*b*, 242*b* of the first and the second shading layer 241, 242 overlap too, which corresponds to a maximum light transmission amount of the shading curtain 24.

FIG. 7B shows the shading curtain 24 in a second state, in which the first light transmission areas 241*a*, 242*a* of the first and the second shading layer 241, 242 are offset from each other by a displacement d2 in the deployment direction R, and the second light transmission areas 241*b*, 242*b* of the first and the second shading layer 241, 242 are also offset from each other by the displacement d2 in the deployment direction R, which may correspond to an intermediate light transmission state of the shading curtain 24.

FIG. 7C shows the shading curtain 24 in a third state, in which the first shading layer 241 is moved relative to the second shading layer 242 by a displacement d3, wherein d3>d2. The first light transmission areas 241*a* of the first shading layer 241 overlap with the second light transmission areas 242*b* of the second shading layer 242, and the second light transmission areas 241*b* of the first shading layer 241 overlap with the first light transmission areas 242*a* of the second shading layer 242, which corresponds to a minimum light transmission amount of the shading curtain 24, especially a completely opaque state thereof.

In an embodiment of a shading curtain (not shown), each shading layer may have first grid-like transparent or translucent light transmission areas and second opaque light transmission areas in the form of horizontal stripes and vertical stripes. In another embodiment of a shading curtain (not shown), each shading layer may have a continuous transparent or semitransparent first light transmission area and a plurality of circular opaque second light transmission areas distributed regularly.

Now, a shading device 20 according to an embodiment of the present disclosure is described with reference to FIGS. 2 to 5.

Figure 2:
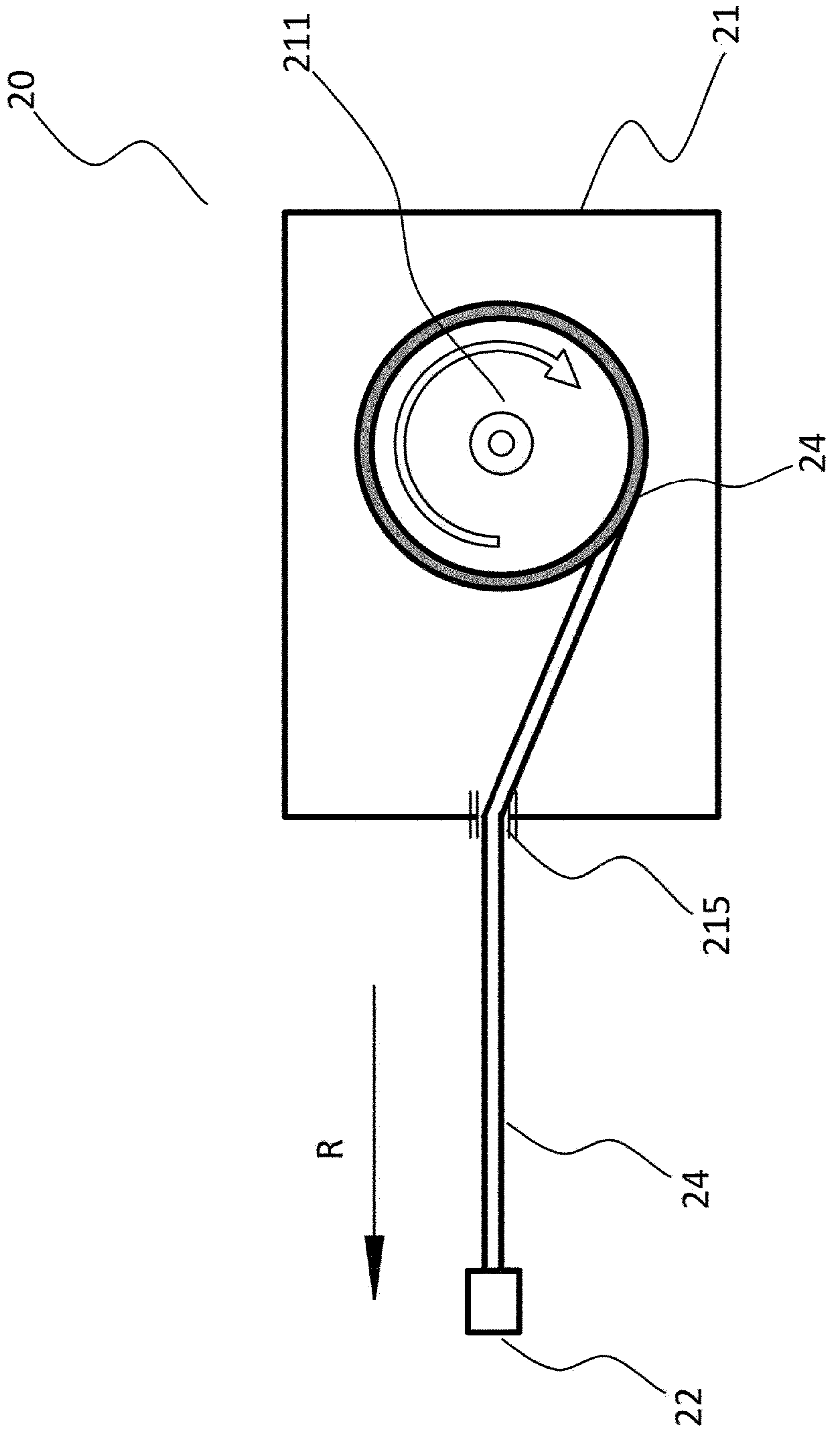
FIG. 2 is a sectional view of a shading device according to an embodiment of the present disclosure, wherein the sectional plane is perpendicular to a longitudinal axis of a reel.
Figure 3:
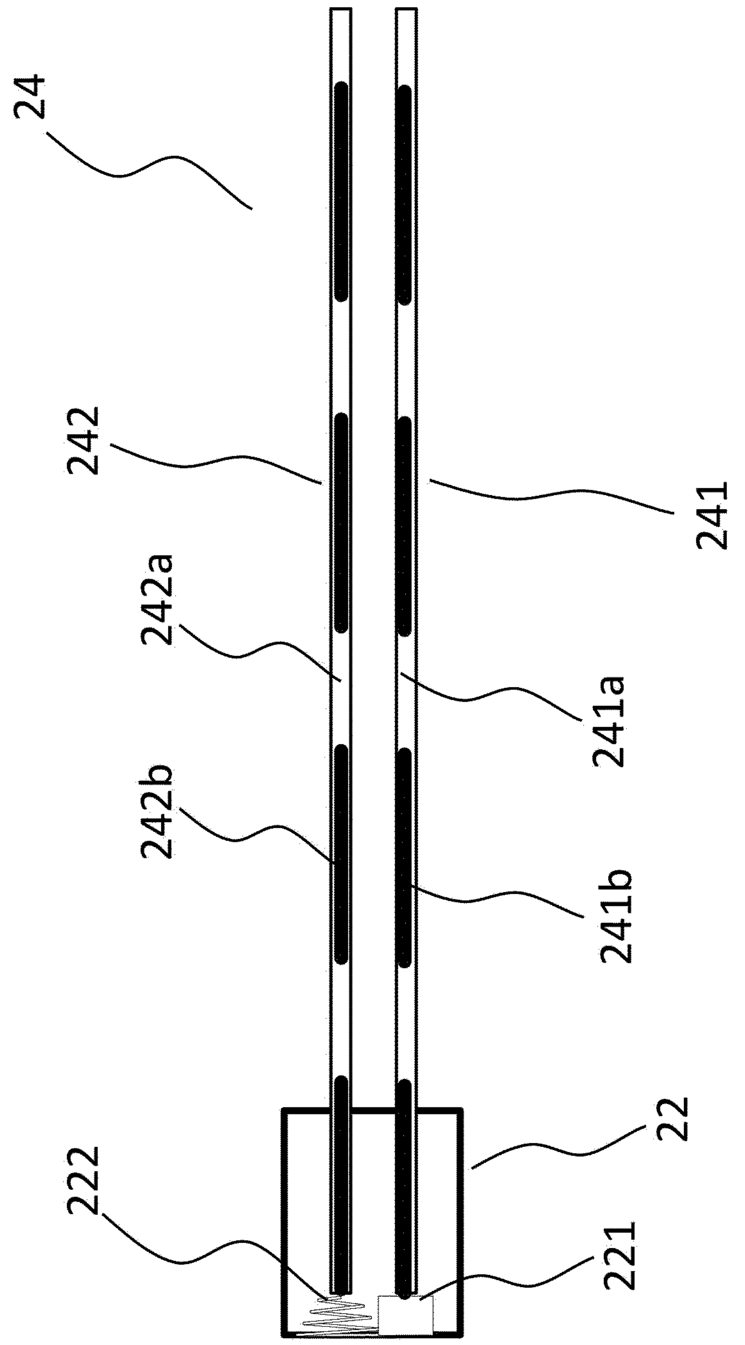
FIG. 3 is a partial enlarged view of FIG. 2.

FIG. 2 is a sectional view of the shading device 20, wherein the sectional plane is perpendicular to a longitudinal axis of a reel 211, and the shading device 20 is partially deployed. In other words, a shading curtain 24 of the shading device 20 is partially drawn out through a slot 215 of a housing 21 of the shading device 20 in a deployment direction R. FIG. 3 is a partial enlarged view of FIG. 2. A first shading layer 241 and a second shading layer 242 of the shading curtain 24 may be rolled on the common reel 211, which may have a circular cross section. As shown in FIG. 3, the shading curtain 24 is in the first state as shown in FIG. 7A, so it may have the maximum light transmission amount. As shown in FIG. 3, a drawing device 22 of the shading device 20 comprises a first drawing member 221 and a second drawing member 222, wherein the first drawing member 221 is connected to the first shading layer 241 and is configured to draw the first shading layer 241, and the second drawing member 222 is connected to the second shading layer 242 and is configured to draw the second shading layer 242. Here, the first drawing member 221 is fixedly arranged in the drawing device 22, and the second drawing member 222 is configured as an elastic element, in particular a spring element.

Figure 4A:
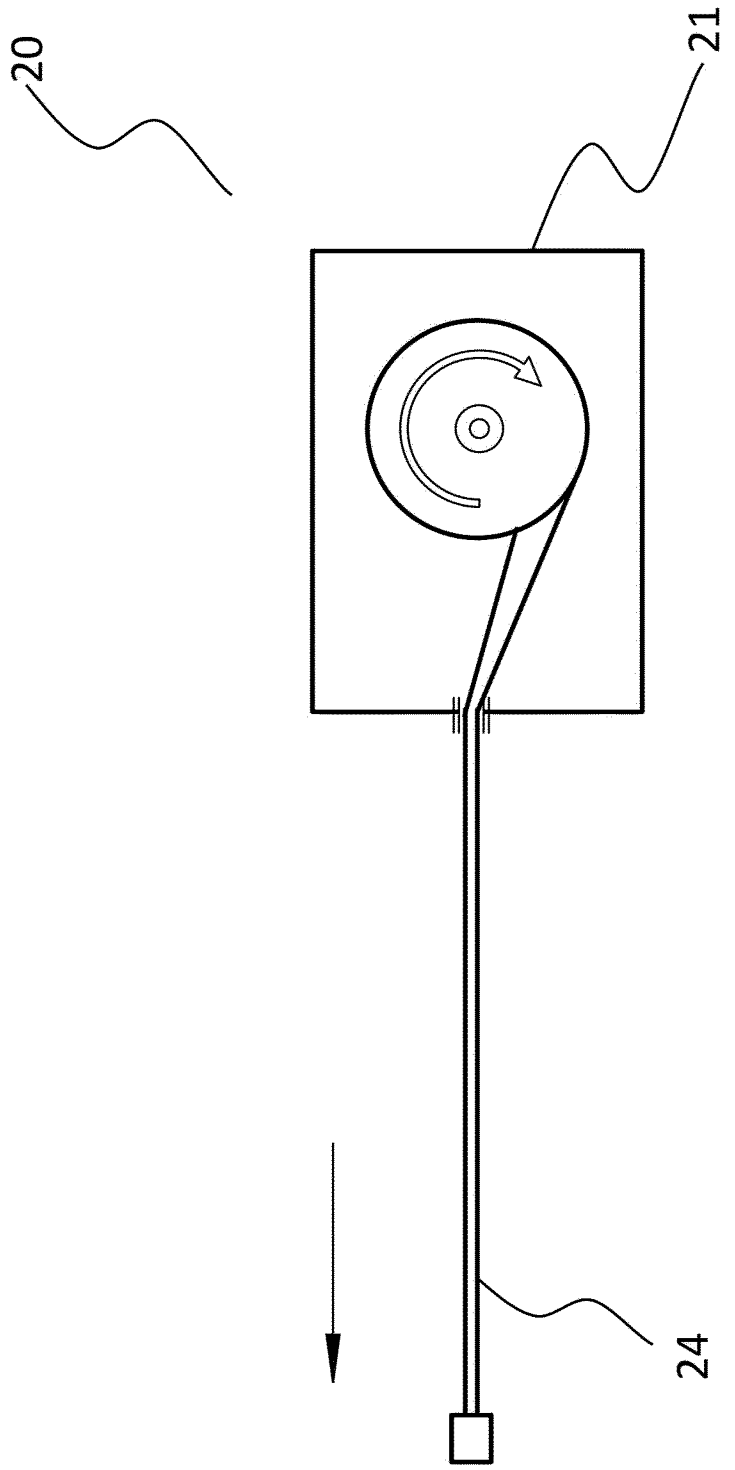
FIG. 4A is a view corresponding to FIG. 2, wherein the shading device is further deployed.
Figure 4B:
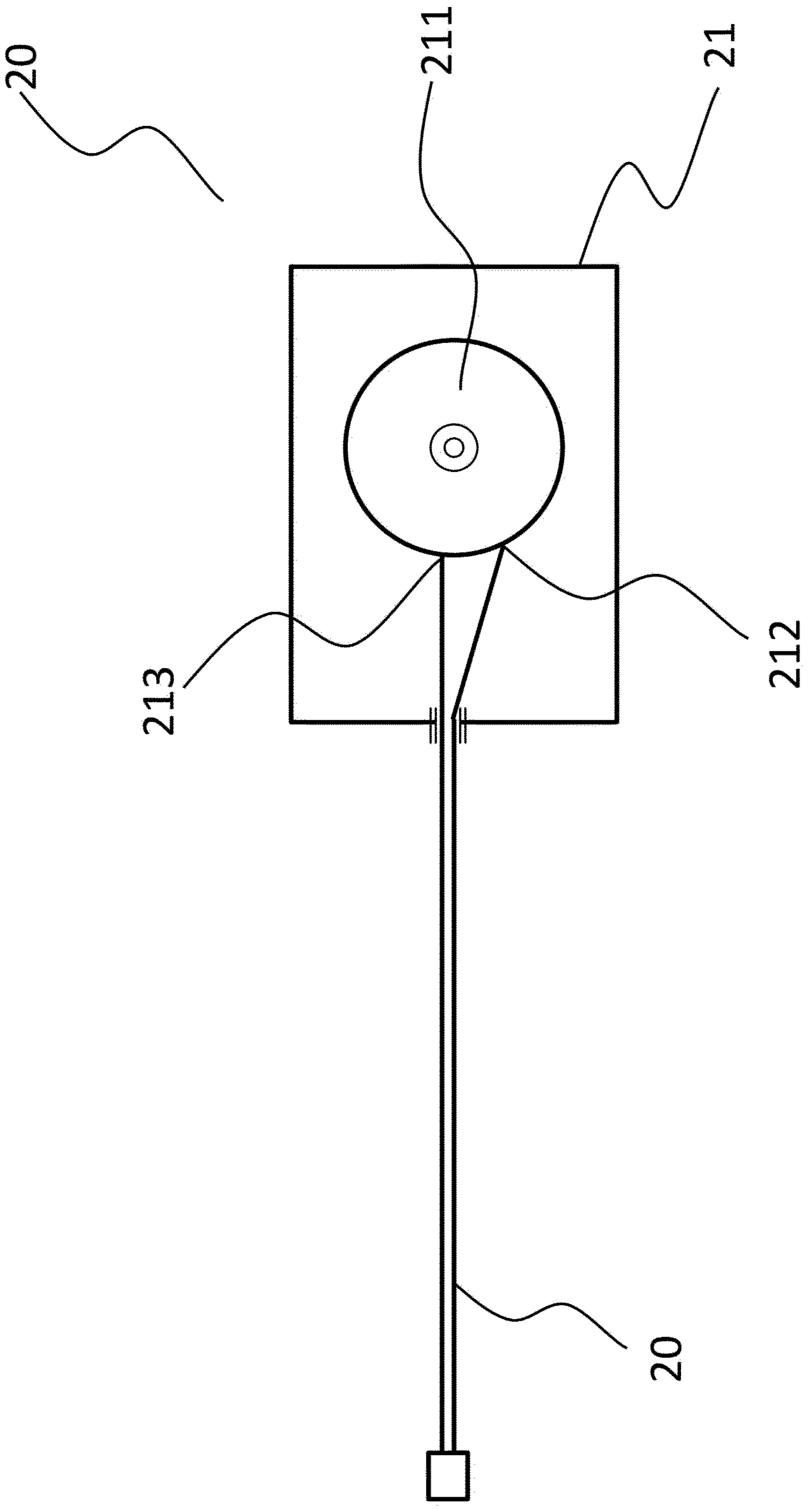
FIG. 4B is a view corresponding to FIG. 2, wherein the shading device is in the fully deployed position.

FIGS. 4A and 4B are views corresponding to FIG. 2 respectively, wherein the shading device 20 is further deployed to a position close to the fully deployed state in FIG. 4A, and the shading device is in the final fully deployed position in FIG. 4B. As shown in FIGS. 4A and 4B, the first shading layer 241 is connected to the reel 211 at a first connection joint 212, and the second shading layer 242 is connected to the reel 211 at a second connection joint 213, which are spaced from each other in a circumferential direction of the reel 211.

Figure 5:
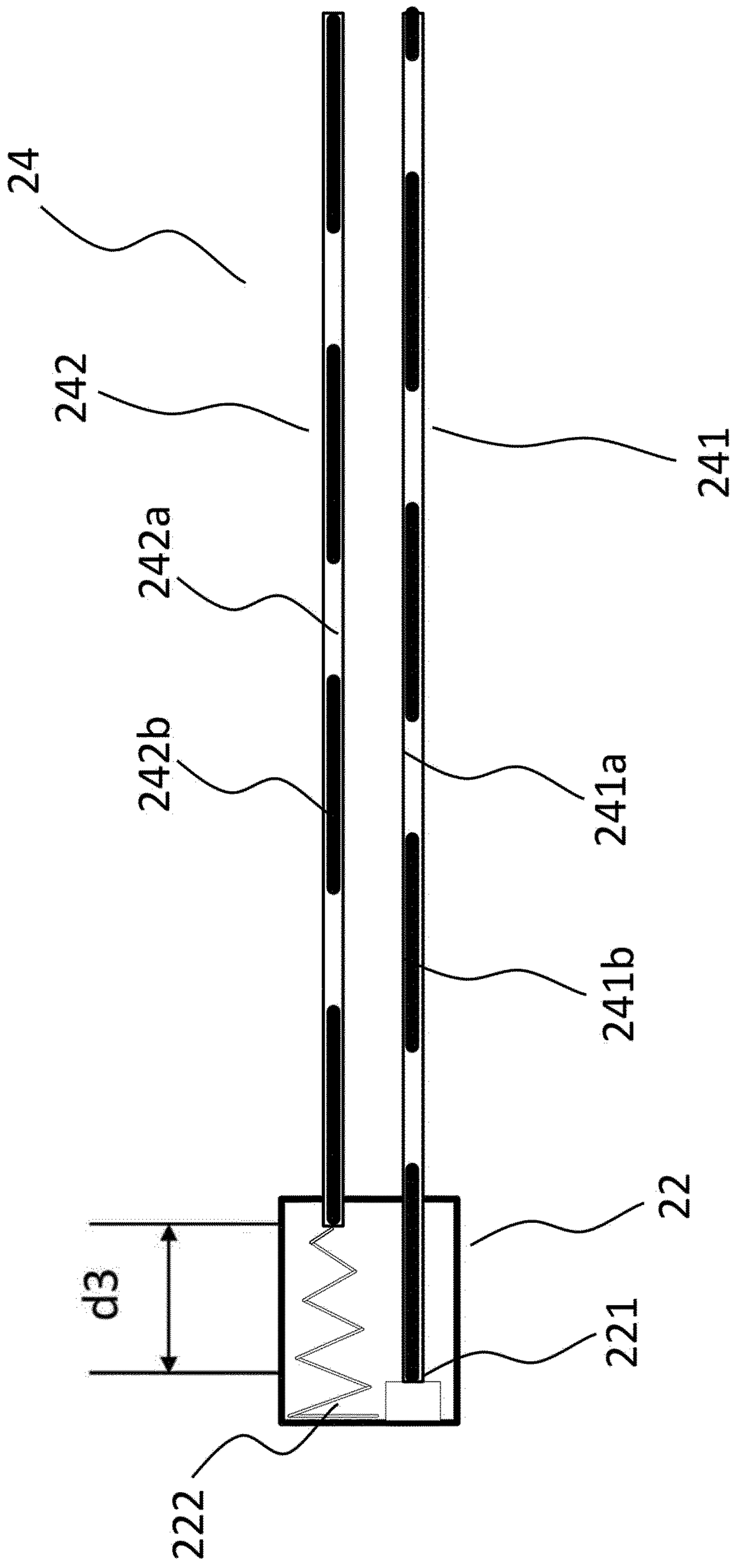
FIG. 5 is a partial enlarged view of FIG. 4B.

From the position of the shading curtain 24 close to the fully deployed position to the fully deployed position of the shading curtain 24 (as shown in FIG. 4B and FIG. 5), the second connection joint 213 applies a tensile force on the second shade layer 242*a*, which is gradually increased, so that the shading curtain 24 is transferred from the first state with the maximum light transmission amount as shown in FIG. 7A and FIG. 3 to the third state with the minimum light transmission amount as shown in FIG. 7C and FIG. 5, in which the second drawing member as a spring element is extended by a length of d3. Though the shading curtain 24 can be fully deployed (as shown in FIG. 4B) and thus has the minimum light transmission amount, it is also possible that the shading curtain 24 can be kept in the state close to the fully deployed as shown in FIG. 4A by a control to the driving device 23, wherein the shading curtain 24 covers most of the side window 2 and the shading curtain per se has the maximum light transmission amount.

Figure 6:
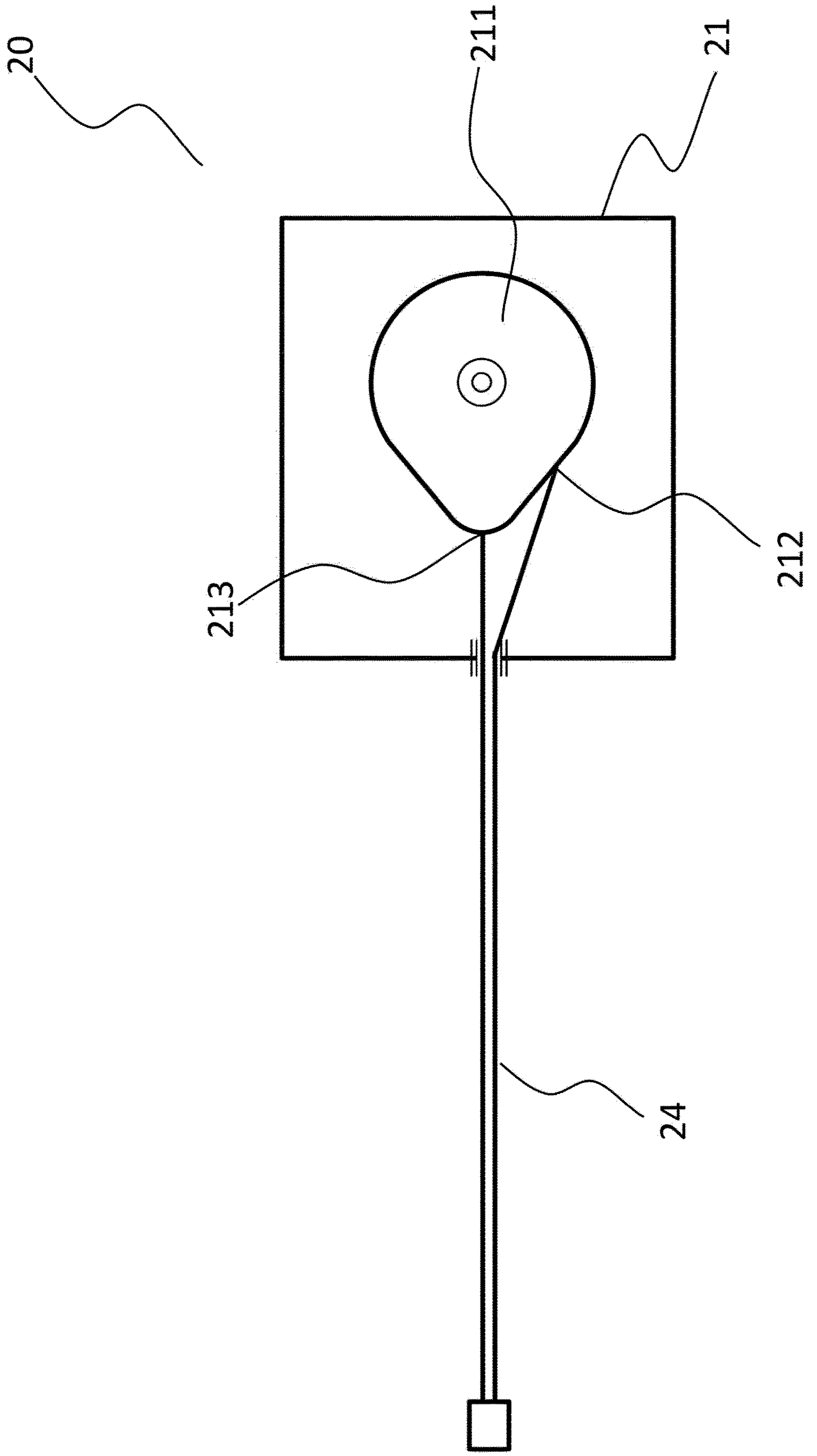
FIG. 6 is a view corresponding to FIG. 4B of a shading device.

FIG. 6 is a view corresponding to FIG. 4B of a shading device 20 according to another embodiment of the present disclosure. The main difference between this embodiment and the above embodiment is that the reel 211 is configured differently. In the embodiment shown in FIG. 6, the reel 211 has a cam cross section, wherein the second connection joint 213 is at an apex of the cam cross section, wherein the first connection joint 212 and the second connection joint 213 are spaced from each other in a circumferential direction of the reel 211. For the other aspects of the shading device 20, references can be made to the description of the above embodiment.

In an embodiment not shown, as an alternative to the second drawing member 222 as a spring element, the second drawing member may also be configured as a spring-loaded movable part in the drawing device, which can be held in its rest position under the spring load and can leave its rest position when the tensile force applied by the second connection joint overcomes the spring force.

In an embodiment not shown, as an alternative to the common reel 211 for the two shading layers, two separate reels parallel to each other may also be provided for the two shading layers, wherein a first reel is connected to the first shading layer at a first connection joint and a second reel is connected to the second shading layer at a second connection joint.

In an embodiment not shown, the first drawing member 221 may be configured as a spring element, and the second drawing member 222 may be configured as a fixed component in the drawing device 22.

In an embodiment not shown, the first drawing member 221 and the second drawing member 222 may be respectively configured as a spring element, wherein one of the spring elements has a greater spring stiffness than the other one.

It can be understood that the present disclosure is described by means of the above specific embodiments, but the present disclosure is not limited to these specific embodiments. Those skilled in the art can make modifications based on the disclosure of this patent application, all of which don't depart from the protection scope of the present disclosure. Individual technical features described in the specification, even if they are described in different paragraphs of the specification or in different embodiments, can be arbitrarily combined with each other, only if they are not contradictory with each other.

The invention claimed is:

1. A shading device, comprising:

a shading curtain having a first and a second shading layer, wherein the first and the second shading layer respectively have at least two types of light transmission areas with different light transmission properties; and a drawing device having a first and a second drawing member, wherein the first drawing member is connected to the first shading layer and is configured to draw the first shading layer, and the second drawing member is connected to the second shading layer and is configured to draw the second shading layer, the shading curtain is configured to be switchable between a retracted state and a fully deployed state, the first and the second shading layer are movable parallelly relative to each other between a first relative position, in which the shading curtain has a first light transmission property, and a second relative position, in which the shading curtain has a second light transmission property, the shading device further comprises a reel with a first connection joint with the first shading layer and a reel with a second connection joint with the second shading layer, the first and the second shading layer are rolled on the respective reel, and the first and the second shading layer are in the first relative position, in the retracted state of the shading curtain, one of the connection joints is configured to apply an enhanced tensile force on the associated shading layer in the fully deployed state in comparison with in the retracted state of the shading curtain, so that the first and the second shading layer are in the second relative position, the reel for the first shading layer and the reel for the second shading layer are the same reel, and the first and the second connection joint are spaced apart in a circumferential direction of the reel, and either:

a) the drawing member, which is associated with the same shading layer as the one connection joint, is configured as a spring element, or b) the drawing member, which is associated with the same shading layer as the one connection joint, is a movable member in the drawing device, wherein the movable member is kept in a rest position by an elastic force of a spring element, and leaves away from its rest position when the tensile force applied by the one connection joint overcomes the elastic force.

2. The shading device according to claim 1, wherein the reel has a circular cross section.

3. The shading device according to claim 1, wherein the reel has a cam cross section, and the one connection joint is located at a vertex of the cam cross section.

4. The shading device according to claim 1, wherein the reel for the first shading layer and the reel for the second shading layer are two separate reels with parallel axes.

5. The shading device according to claim 1, wherein the one connection joint is the second connection joint, and the second shading layer is an outer shading layer of the shading curtain.

6. The shading device according to claim 1, wherein the first light transmission property corresponds to one of a maximum light transmission amount and a minimum light transmission amount of the shading curtain, and the second light transmission property corresponds to the other of the maximum light transmission amount and the minimum light transmission amount of the shading curtain.

7. The shading device according to claim 6, wherein each shading layer has distributed first light transmission areas and distributed second light transmission areas, wherein the first light transmission areas have a higher light transmission rate than the second light transmission areas, wherein the first light transmission areas of the first and the second shading layer overlap and the second light transmission areas of the first and the second shading layers overlap in the first relative position, and wherein the first light transmission areas of the first shading layer overlap with the second light transmission areas of the second shading layer and the second light transmission areas of the first shading layer overlap with the first light transmission areas of the second shading layer in the second relative position.

8. The shading device according to claim 7, wherein the first transmission areas are transparent or translucent, and the second transmission areas are opaque.

9. The shading device according to claim 1, wherein the shading device is configured for a side window of a motor vehicle, and the shading curtain is configured to be deployed from one of a front side and a rear side of the side window to the other side thereof.

10. A vehicle comprising the shading device according to claim 1.

11. A shading device, comprising:

a shading curtain having a first and a second shading layer, wherein the first and the second shading layer respectively have at least two types of light transmission areas with different light transmission properties; and a drawing device having a first and a second drawing member, wherein the first drawing member is connected to the first shading layer and is configured to draw the first shading layer, and the second drawing member is connected to the second shading layer and is configured to draw the second shading layer, the shading curtain is configured to be switchable between a retracted state and a fully deployed state, the first and the second shading layer are movable parallelly relative to each other between a first relative position, in which the shading curtain has a first light transmission property, and a second relative position, in which the shading curtain has a second light transmission property, the shading device further comprises a reel with a first connection joint with the first shading layer and a reel with a second connection joint with the second shading layer, the first and the second shading layer are rolled on the respective reel, and the first and the second shading layer are in the first relative position, in the retracted state of the shading curtain, one of the connection joints is configured to apply an enhanced tensile force on the associated shading layer in the fully deployed state in comparison with in the retracted state of the shading curtain, so that the first and the second shading layer are in the second relative position, the reel for the first shading layer and the reel for the second shading layer are the same reel, and the first and the second connection joint are spaced apart in a circumferential direction of the reel, and the reel has a cam cross section, and the one connection joint is located at a vertex of the cam cross section.

* * * * *